(12) United States Patent
Basso et al.

(10) Patent No.: US 10,675,825 B2
(45) Date of Patent: Jun. 9, 2020

(54) SYSTEMS AND METHODS FOR SHAPING OPTICAL FIBERS

(71) Applicant: AFL Telecommunications LLC, Duncan, SC (US)

(72) Inventors: Eric Basso, Greer, SC (US); Mohamed Amine Jebali, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 449 days.

(21) Appl. No.: 15/411,405

(22) Filed: Jan. 20, 2017

(65) Prior Publication Data

US 2017/0203527 A1    Jul. 20, 2017

Related U.S. Application Data

(60) Provisional application No. 62/280,888, filed on Jan. 20, 2016.

(51) Int. Cl.
  *B29D 11/00* (2006.01)
  *G02B 6/255* (2006.01)

(52) U.S. Cl.
  CPC .. *B29D 11/00961* (2013.01); *B29D 11/00663* (2013.01); *G02B 6/2551* (2013.01); *G02B 6/2552* (2013.01)

(58) Field of Classification Search
  CPC ........ B29D 11/00961; B29D 11/00663; G02B 6/4479
  See application file for complete search history.

(56) References Cited

U.S. PATENT DOCUMENTS

2014/0361452 A1* 12/2014 Zheng .............. B29D 11/00663
                                                              264/1.24
2015/0277430 A1* 10/2015 Linnell ................ G05B 19/409
                                                                 700/257

* cited by examiner

*Primary Examiner* — Mathieu D Vargot
(74) *Attorney, Agent, or Firm* — Dority & Manning, P.A.

(57) ABSTRACT

A method of shaping an optical fiber includes displaying a user interface on a display screen. The user interface includes a timeline, a plurality of optical fiber manipulation parameter blocks within the timeline, and a script block including a plurality of script elements. The method further includes receiving data indicative of a user input selection of a script element for an optical fiber manipulation parameter block and a user input entry of one or more properties of the script element; determining, in response to the user input selection and user input entry, one or more actions to be performed by an optical fiber processing machine to shape the optical fiber; and providing, by the one or more computing devices, one or more control signals to the optical fiber processing machine to cause the optical fiber processing machine to perform the one or more actions.

20 Claims, 6 Drawing Sheets

FIG. 5
FIG. 6
FIG. 7
FIG. 8

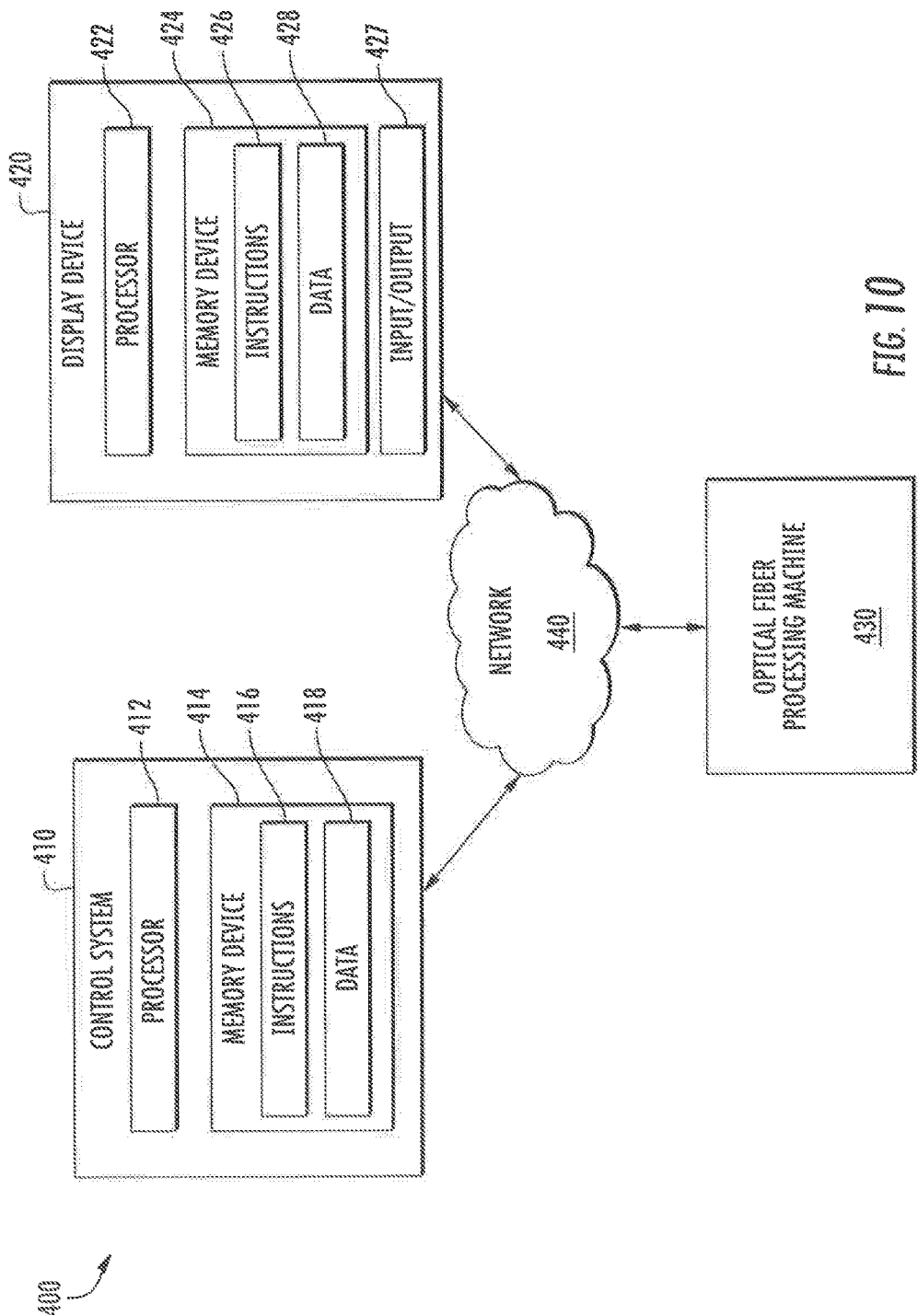

SYSTEMS AND METHODS FOR SHAPING OPTICAL FIBERS

PRIORITY STATEMENT

The present application claims priority to U.S. Provisional Patent Application Ser. No. 62/280,888, filed Jan. 20, 2016 and which is incorporated by reference herein in its entirety.

FIELD OF THE INVENTION

The present disclosure relates generally to systems and method for shaping optical fibers, more particularly using improved user interfaces in conjunction with optical fiber processing machines.

BACKGROUND OF THE. INVENTION

Modern demand for miniaturization has driven the development of increasingly compact, reliable, and low-cost fiber-based components for use in a variety of applications in the medical, sensing, and telecom fields. The availability of these increasingly complex components is credited to glass processing technology that enables engineers to develop repeatable fabrication processes for optical fiber processing machines, such as optical fiber splicers.

These machines offer great flexibility, capable of controlling the position, motion, imaging, and heating of optical fibers, but their complexity often makes development lengthy and somewhat arcane. This is especially true of more advanced components, such as lensed fibers, tapered ball lenses and multi-tapered fibers, requiring long hours of development for engineers and specially trained operators for production.

For example, known machines utilize software which is dedicated to easing development of certain specified comment shapes. However, new, custom, or complex shapes for which specifically tailored software has not been developed are extremely difficult to develop. For example, the variables for each motor of the machine must be individually set, with times, directions, speeds, accelerations, etc. all set independent of one another. Depending on the scripting used, setting the above routine can range from time consuming to obstructively unintuitive. Further, feedback when testing a developed program is minimal, and if the desired shaping is not obtained, the user must guess as to which variables to adjust and how to adjust them.

Accordingly, improved systems and methods for shaping optical fibers are desired.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a computer-implemented method of shaping an optical fiber is provided. The method includes displaying, by one or more computing devices, a user interface on a display screen. The user interface includes a timeline, a plurality of optical fiber manipulation parameter blocks within the timeline, and a script block including a plurality of script elements. The method further includes receiving, by the one or more computing devices, data indicative of a user input selection of a script element for an optical fiber manipulation parameter block and a user input entry of one or more properties of the script element. The method further includes determining, by the one or more computing devices and in response to the user input selection and user input entry, one or more actions to be performed by an optical fiber processing machine to shape the optical fiber. The method further includes providing, by the one or more computing devices, one or more control signals to the optical fiber processing machine to cause the optical fiber processing machine to perform the one or more actions.

In accordance with another embodiment of the present disclosure, a system for shaping an optical fiber is provided. The system includes a display device configured to display a user interface, the user interface including a timeline, a plurality of optical fiber manipulation parameter blocks within the timeline, and a script block comprising a plurality of script elements. The system further includes a control system configured to receive data indicative of a user input selection of a script element far an optical fiber manipulation parameter block and a user input entry of one or more properties of the script element; determine, in response to the user input selection and user input entry, one or more actions to be performed by an optical fiber processing machine to shape the optical fiber; and provide one or more control signals to the optical fiber processing machine to cause the optical fiber processing machine to perform the one or more actions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best node thereof, directed to one of ordinary skill in the art, is set forth in the specification, which makes reference to the appended figures, in which:

FIG. 5 is a command block of a user interface in accordance with embodiments of the present disclosure;

FIG. 6 is a command block of a user interface in accordance with embodiments of the present disclosure;

FIG. 7 is a conditional block of a user interface in accordance with embodiments of the present disclosure;

FIG. 8 is a motor movement block of a user interface in accordance with embodiments of the present disclosure;

FIG. 10 is an example system in accordance with embodiments of the present disclosure.

DETAILED DESCRIPTION OF THE INVENTION

Figure 2:
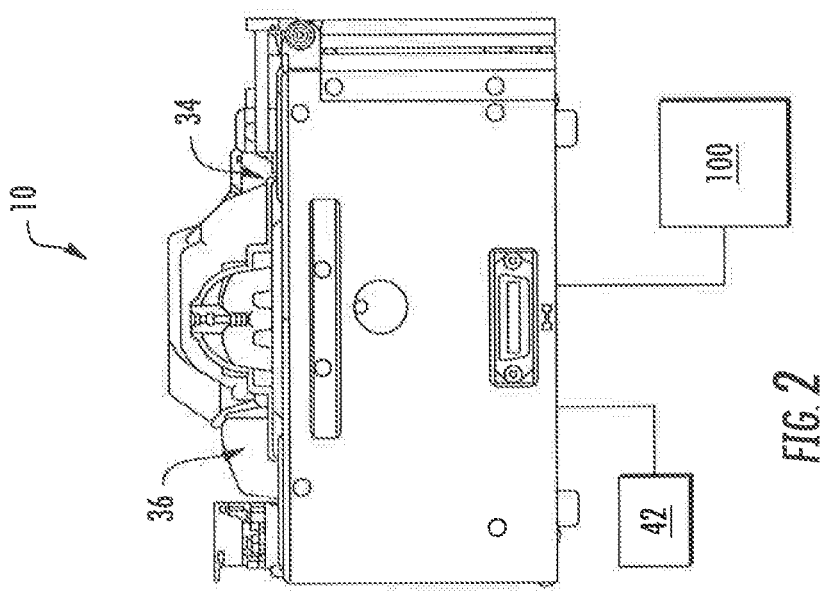
FIG. 2 is a side view of an optical fiber processing machine in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to systems and methods of shaping optical fibers. For example, a user interface may be displayed, such as by the system. The user interface may include a timeline, a plurality of optical fiber manipulation parameter blocks within the timeline, and a script block comprising a plurality of script elements. Each parameter block may be related to the operation of a component of an optical fiber processing machine, such as a motor or heating element. Each script element provides various functions which may be performed for or by one or more parameter blocks. The user interface may further include a control block which includes a plurality of control elements. Each control element provides operational commands involving implementation of the timeline, including script elements provided therein and properties thereof for each parameter block.

A user may interact with the user input to develop a program to shape an optical fiber. For example, one or more computing devices may receive data indicative of a user input selection of a script element for a parameter block. In other words, the user may select a script element and apply it to a particular parameter block. The computing device may further receive data indicative of a user input entry of one or more properties of the script element. In other words, the user may enter properties that are specific to that script element for that particular parameter block. The script element may further be located at a time-based location, such a discrete time period, along the timeline within the particular parameter block. The entered properties may cause a particular action to be taken by the optical fiber processing machine during shaping of an optical fiber.

Receipt of such user input selection and user input entry may occur one or more times for each parameter block within the timeline, to build a shaping program for an optical fiber.

The one or more computing devices may further determine, in response to the user input selection(s) and user input entry(s), one or more actions to be performed by an optical fiber processing machine to shape the optical fiber. Further, the one or more computing devices may provide the one or more control signals to the optical fiber processing machine to cause the optical fiber processing machine to perform the one or more actions.

The systems and methods described herein may provide a number of technical effects and benefits. For example, systems and methods in accordance with the present disclosure may advantageously reduce the amount of time required to develop optical fiber shaping programs. Further, systems and methods in accordance with the present disclosure may facilitate immediate, easily identifiable feedback during testing and operation of the associated optical fiber processing machine. Still further, systems and methods in accordance with the present disclosure may limit the allocation of processing and storage resources that are required for optical fiber shaping program development and implementation. The saved resources can be allocated to other functions of the operations computing systems, etc.

The systems and methods in accordance with the present disclosure also provide an improvement to optical fiber shaping technology. For example, systems and methods in accordance with the present disclosure can display a user interface, and receive data indicative of user input selections of a script element for an optical fiber manipulation parameter block and user input entries of one or more properties of the script element. Systems and methods in accordance with the present disclosure can further determine one or more actions to be performed by an optical fiber processing machine to shape the optical fiber and provide control signals to the optical fiber processing machine to cause the optical fiber processing machine to perform the one or more actions. The display and receipt of data as discussed herein advantageously reduce the amount of time required to develop optical fiber shaping programs and allows for unique, complex optical fiber shapes to be designed and implemented. Further, such display and receipt of data facilitates immediate, easily identifiable feedback during testing and operation of the associated optical fiber processing machine.

Figure 1:
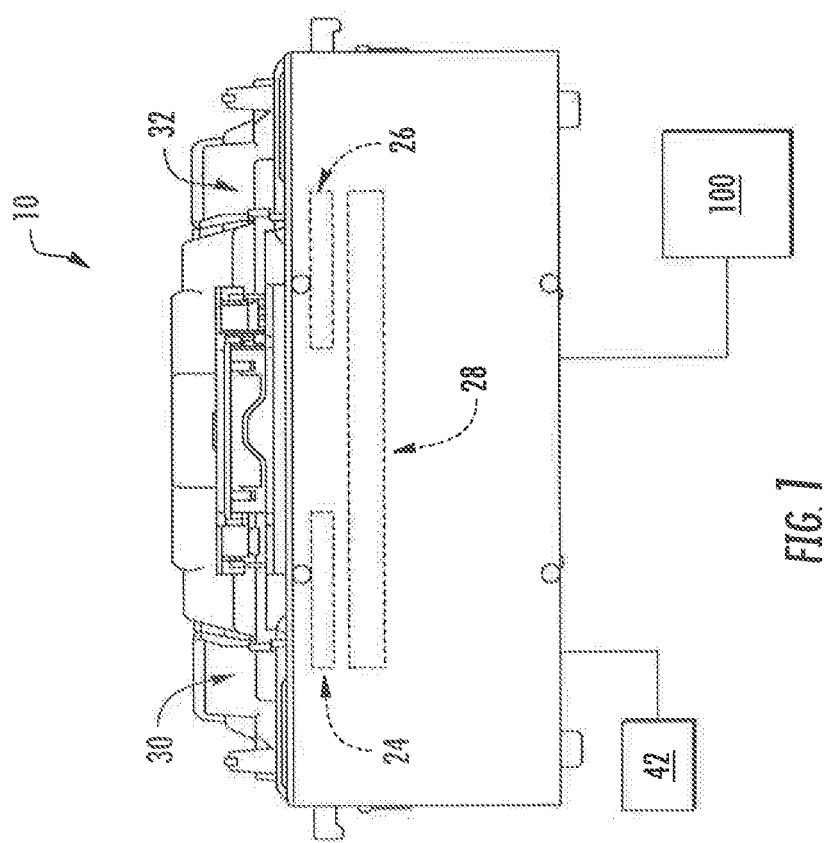
FIG. 1 is a front view of an optical fiber processing machine in accordance with embodiments of the present disclosure.
Figure 3:
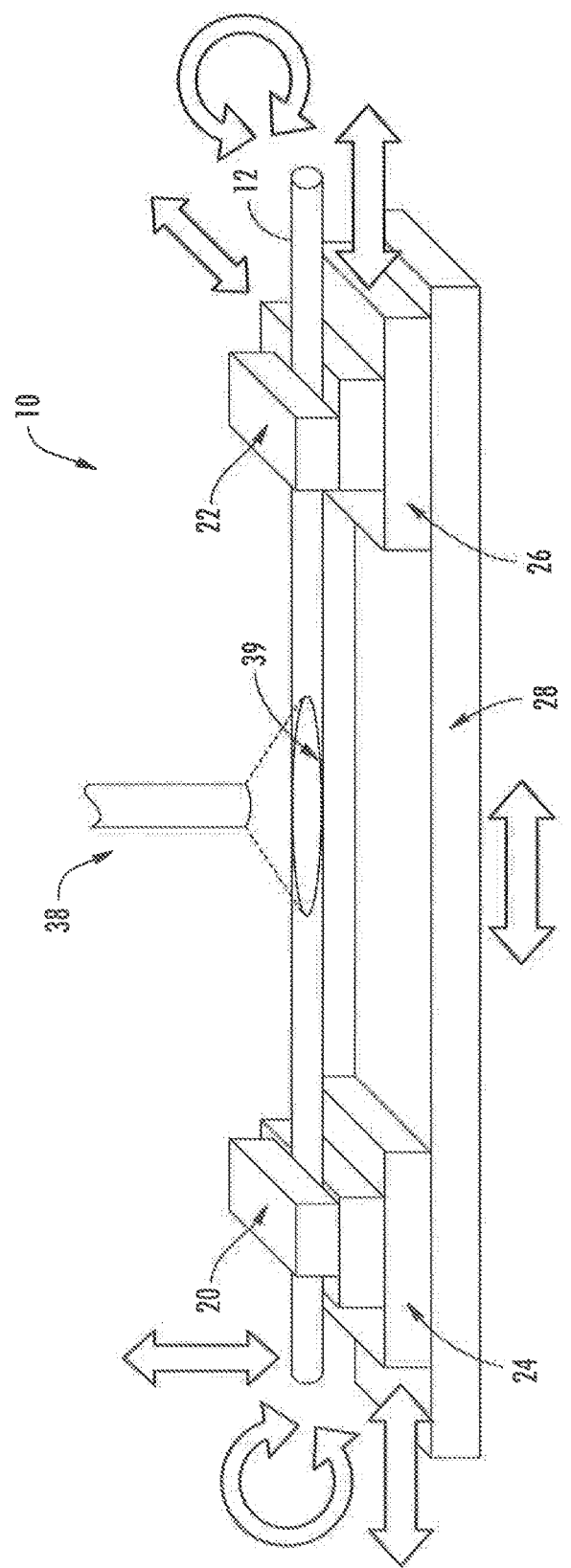
FIG. 3 is a schematic perspective view of components of an optical fiber processing machine in accordance with embodiments of the present disclosure.

Referring now to FIGS. 1 through 3, embodiments of an optical fiber processing machine 10 are provided. An optical fiber processing machine 10 in accordance with the present disclosure is a machine that can be utilized for processing, such as shaping and/or splicing, an optical fiber 12. In exemplary embodiments, a machine in accordance with the present disclosure is an optical fiber splicer.

A machine 10 in accordance with the present disclosure may include one or more clamping devices for securing optical fiber 12 for manipulation and shaping, such as a first clamping device (referred to conventionally as a left clamping device) 20 and a second clamping device (referred to conventionally as a right clamping device 22). Further, each clamping device 20, 22 may be moved in various directions by operation of various motors of the machine 10.

For example, the machine 10 may include one or more of a first (left) Z-axis motor 24, a second (right) Z-axis motor 26, a third (sweep) Z-axis motor 28, a first (left) rotational motor 30, a second (right) rotational motor 32, a Y-axis motor 34, and/or a X-axis motor 36. Operation of the left Z-axis motor 24 may cause translation of the left clamping device 20 along a Z-axis of the machine 10, thus also causing translation of at least a portion of the optical fiber 12. Operation of the right Z-axis motor 26 may cause translation of the right clamping device 22 along the Z-axis of the machine 10, thus also causing translation of at least a portion of the optical fiber 12. Operation of the sweep Z-axis motor 28 may cause translation of both the left and right clamping devices 20, 22 along the Z-axis of the machine 10, thus causing translation of the optical fiber 12. Operation of the left rotational motor 30 may cause rotation of the left clamping device 20 about the Z-axis of the machine 10, thus also causing rotation of at least a portion of the optical fiber 12. Operation of the right rotational motor 32 may cause rotation of the right clamping device 22 about the Z-axis of the machine 10, thus also causing rotation of at least a portion of the optical fiber 12. Operation of the Y-axis motor 34 may cause translation of one of the left or right clamping devices 20, 22 along the Y-axis of the machine 10, thus causing translation of the optical fiber 12. Operation of the X-axis motor 36 may cause translation of the other of the left or right clamping devices 20, 22 along the X-axis of the machine 10, thus causing translation of the optical fiber 12.

FIG. 3 provides arrows which indicate the various movement directions caused by each such motor.

It should be understood that the X-, Y- and Z-axes are mutually orthogonal axes. When inserted for shaping, a longitudinal axis of the optical fiber 12 to be shaped extends generally along the Z-axis.

Machine 10 may further include a heating element 38. The heating element may be a laser, such as a $CO_2$ laser, or an electrical heating element which generates an electrical arc, or any other suitable heating element for heating an optical fiber for processing. The heating element 38 may be positioned to heat a target zone 39 of the optical fiber 12 when operating.

Machine 10 and systems including machine 10 may further include display device 40. The display device 40 may include one or more display screens, and can display a user interface and components thereof as discussed herein. Further, machine 10 and systems including machine 10 can include one or more input devices 42 that can be used by one or more users to provide input to one or more processors and interact with the machine 10 and system include machine 10. An input device 42 may, for example, include a joystick, multi-way rocker switches, mouse, trackball, keyboard, touch screen, touch pad, data entry keys, a microphone suitable for voice recognition, or any other suitable device. Through use of the input devices 42, the one or more users can interact with the graphic and/or textual data elements provided for display on the screens of the display devices 110.

For instance, one or more user interfaces 50 can be displayed on the one or more display devices 40. In some implementations, one or more of the display devices 40 can be operably coupled with the input devices 42 such that a user can interact with the user interface 50 (e.g., cursor interaction via trackball, mouse, etc.) and the textual and/or graphical elements included in the user interface 50. Additionally, and/or alternatively, the display devices 40 can include a touch display screen that can allow a user to visualize the user interface 50 on the touch display screen and interact with the user interface 50 through the touch display screen.

The one or more display devices 40 can be configured to be in wired and/or wireless communication with a control system 100. For instance, in some implementations, a display device 40 can communicate with the control system 100 via a network. The one or more display devices 40 can be configured to receive a user interaction with the user interface 50 and to provide data indicative of the user interaction to the control system 100. For instance, a user can provide an interaction via an input device 42 or touch screen. One or more of the display devices 40 can send data indicative of the user's interaction with the input device 42 or touch screen to the control system 100. The control system 100 can be configured to receive data indicative of the user's interaction with the input device 42 or touch screen.

In response, the control system 100 can be configured to provide one or more signals (e.g., command signals) to machine 10 to take actions as discussed herein. For instance, the control system 100 can be in wired or wireless communication with the machine 10. Additionally, and/or alternatively, the control system 100 can be configured to communicate with the machine 10 via a network.

In response to receiving the one or more command signals, the machine 10 and components thereof can execute a control action to complete at least a portion of an action.

Referring now to FIGS. 4 through 8, a user interface 50 may include a timeline 52, a plurality of optical fiber manipulation parameter blocks 54 within the timeline 52, and a script block 56 comprising a plurality of script elements 58. The timeline 52 may provide a visual representation of a time period for a developed optical fiber shaping program as the program is being developed by a user and as the program is being run, either during testing or actual commercial operation. Each of the plurality of optical fiber manipulation parameter blocks 54 is a visual representation corresponding to operation of a component of the machine 10 which manipulates an optical fiber 12, such as a motor or heating element as discussed herein. A user may insert one or more script elements 58 into one or more parameter blocks 54, and may further provide properties for the script element(s) 58, in order to cause the associated component of the machine 10 to manipulate an optical fiber in accordance with these properties. The script elements 58 may further be inserted at discrete time-based locations along the timeline, such that the actions performed by the associated component of the machine 10 to manipulate an optical fiber in accordance with these properties occurs at a specified time during a program being run.

A plurality of optical fiber manipulation parameter blocks 54 may be provided within the timeline 52. The plurality of parameter blocks 54 may include, for example, one or more of a left Z-axis motor block, a right Z-axis motor block, a Z-axis sweep motor block, a left rotation motor block, a right rotation motor block, a Y-axis motor block, a Z-axis motor block, and/or a heating element block. The left Z-axis motor block may be associated with, and thus result in control signals being provided to, the left Z-axis motor 24. The right Z-axis motor block may be associated with, and thus result in control signals being provided to, the right Z-axis motor 26. The Z-axis sweep motor block may be associated with, and thus result in control signals being provided to, the sweep Z-axis motor 28. The left rotation motor block may be associated with, and thus result in control signals being provided to, the left rotational motor 30. The right rotation motor block may be associated with, and thus result in control signals being provided to, the right rotational motor 32. The Y-axis motor block may be associated with, and thus result in control signals being provided to, the Y-axis motor 34. The X-axis motor block may be associated with, and thus result in control signals being provided to, the X-axis motor 36. The heating element block may be associated with, and thus result in control signals being provided to, the heating element 38. Control signals provided to such components via the inclusion of properties for script element(s) 58 inserted in the associated parameter blocks 54 may result in operation of these components as discussed herein to take actions as specified by the properties.

As discussed, the script block 56 may include a plurality of script elements 58. One or more script elements 58 may be selected by a user and inserted into the timeline 52 within a parameter block 54 for a program. The script elements 58 included in the script block 56 for selection may include one or more of a command block, a conditional block, a mode call element, a motor movement block, and/or a recipe call element. When a script element 58 is selected by a user, the user may be prompted to insert properties into the script element 58. These properties may be instructions to the machine 10 for operation of the components thereof, or instructions to the control system 100 to access data stored in control system 100 for use in a program.

Figures 5, 6, 7, 8:
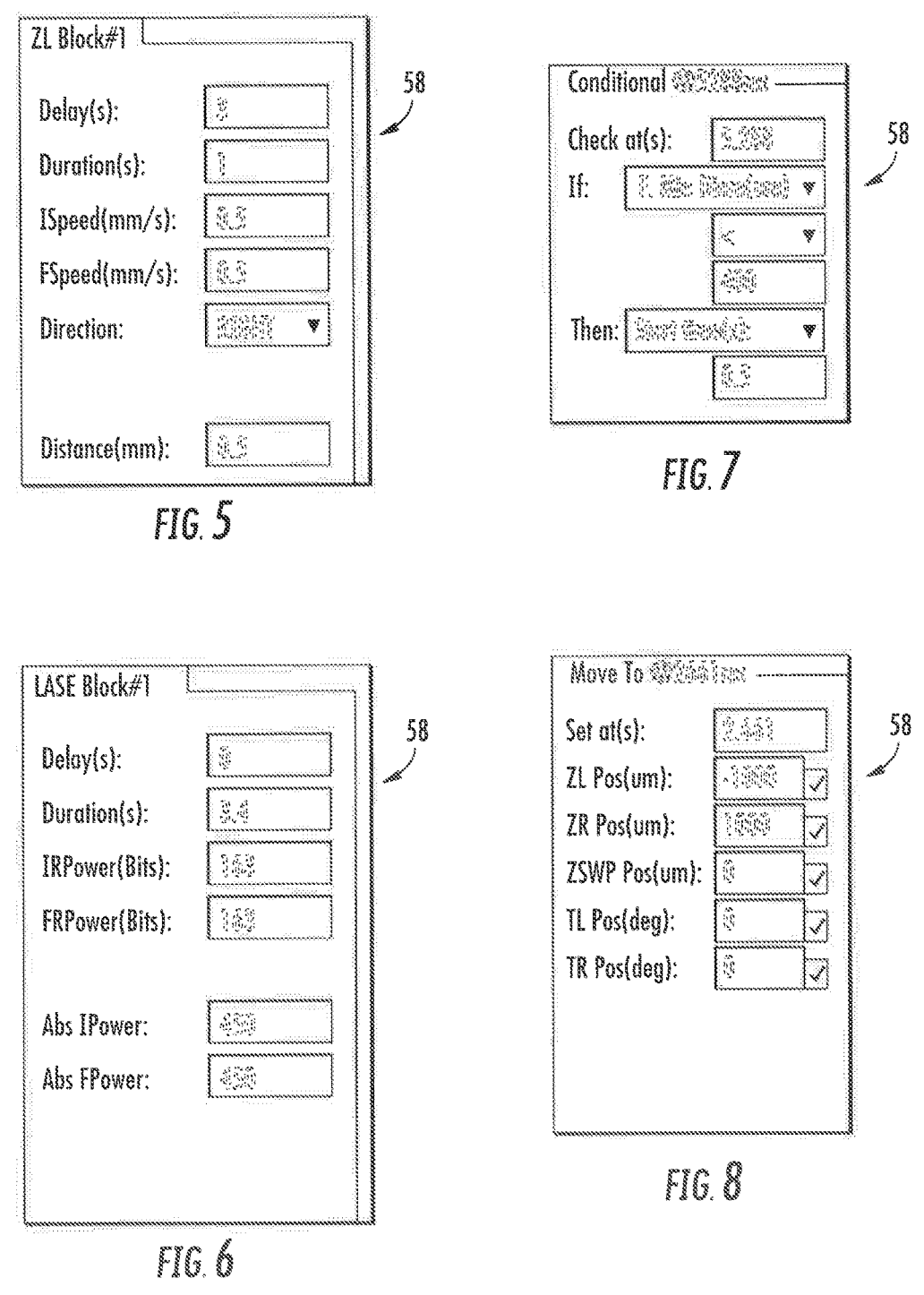

For example, the command block may facilitate the entry of one or more properties that direct operation of the component of machine 10 associated with the parameter block 54 in which the command block is inserted, as shown in FIGS. 5 and 6. Properties which may be entered include one or more of a delay time, a duration, an initial intensity, a final intensity, a direction, and/or a distance. For example, as illustrated in FIG. 5, when the parameter block 54 in which the command block is inserted is associated with a motor, as discussed herein, the properties which may be entered include one or more of a delay time, a duration, an initial speed, a final speed, a direction, and/or a distance. As illustrated in FIG. 6, when the parameter block 54 in which the command block is inserted is associated with a heating element, as discussed herein, the properties which may be entered include one or more of a delay time, a duration, an initial power (which may be relative and/or absolute), and/or a final power (which may be relative and/or absolute). The actions taken due to the properties in the command block may further be set to take place during a specified time, period due to the command block being inserted at a specified time-based location within the timeline 52.

Referring now to FIG. 7, the conditional block max facilitate the entry of one or more properties that direct operation of the program if certain of the properties are met. More specifically, the conditional block operates as an "if/then" statement for the program, and causes certain functions of the program to occur if certain properties are met (such as equal to, greater than, less than, etc. as specified). Examples of properties that can be checked to see if they are met include minimum optical fiber diameter, maximum optical fiber diameter, left Z-axis motor 24 position, right Z-axis motor 26 position, sweep Z-axis motor 28 position, left rotational motor 30 position, right rotational motor 32 position, hit count, and/or GPIB (Power Meter) value. Examples of functions that occur in the program if the specified property is met include changing of a start time, pausing a program, and/or stopping a program. The functions that occur due to a conditional block may further be set to take place at or during a specified time period due to the conditional block being inserted at a specified time-based location within the timeline 52. Further, it should be noted that a conditional element, which applied, may appear in the timeline as an element which is included in ail parameter block 54 and which may utilize the components associated with any one or more of the parameter blocks 54.

Referring now to FIG. 8, the motor movement block may facilitate the entry of one or more properties that direct movement ozone or more motors of machine 10 to specified relative or absolute positions. Properties which may be entered may include a relative or absolute motor position for the left Z-axis motor 24, right Z-axis motor 26, a sweep Z-axis motor 28, left rotational motor 30, and/or right rotational motor 32. The actions taken due to the properties in the motor movement block may further be set to take place during a specified time period due to the motor movement block being inserted at a specified time-based location within the timeline 52. Further, it should be noted that a motor movement element, which applied, may appear in the timeline as an element which is included in all parameter block 54 and which may utilize the components associated with any one or more of the parameter blocks 54.

Referring again to FIG. 4, the mode call element may cause a pre-programmed mode of the machine 10 to be run as a part of the program being developed. Properties which may be entered when a mode call element is selected include, for example, a reference to a pre-programmed mode of the machine 10. The mode that is caused to operate due to a mode call block may further be set to take place at or during a specified time period due to the mode call element being inserted at a specified time-based location within the timeline 52. Further, it should be noted that a mode call element, which applied, may appear in the timeline as an element which is included in all parameter block 54 and which may utilize the components associated with any one or more of the parameter blocks 54.

Figure 4:
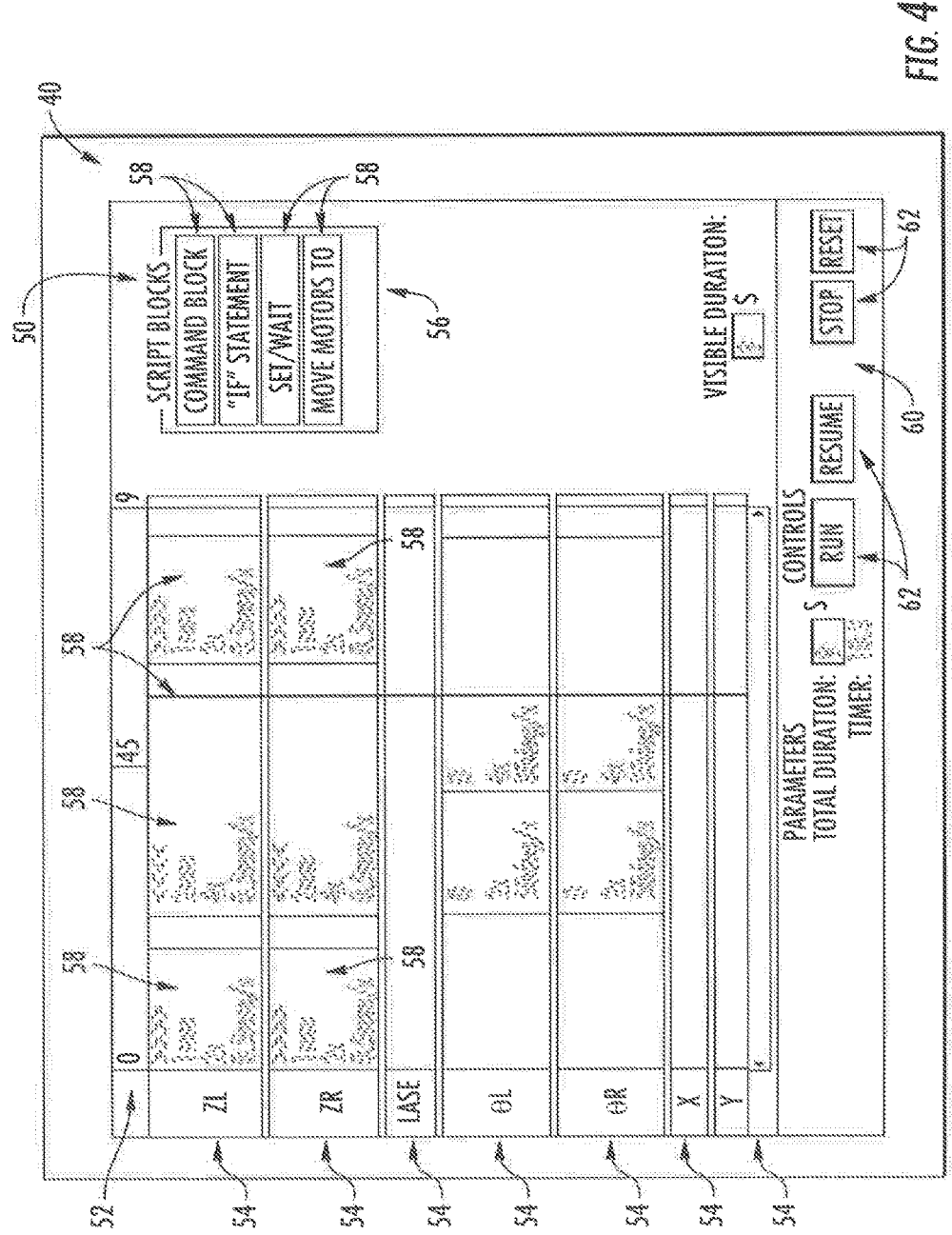
FIG. 4 is a user interface in accordance with embodiments of the present disclosure.

Referring still to FIG. 4, the recipe call element may cause a pre-programmed recipe (i.e. a saved program previously developed by a user) to be run as a part of the program being developed. Properties which may be entered when a recipe call element is selected include, for example, a reference to a pre-programmed recipe. The recipe that is caused to operate due to a recipe call block may further be set to take place at or during a specified time period due to the recipe call element being inserted at a specified time-based location within the timeline 52. Further, it should be noted that a recipe call element, which applied, may appear in the timeline as an element which is included in all parameter block 54 and which may utilize the components associated with any one or more of the parameter blocks 54.

User interface 50 may further include a control block 60 which may include a plurality of control elements 62. Examples of control elements 62 may include a run element, a resume element, a stop element, and/or a reset element. User selection of a control element may cause operation of the program, and resulting providing of control signals to the machine 10, as required by that control element. For example, actions to be taken by the machine 10 to shape an optical fiber based on inputs to the user interface 50 and a resulting developed program may be determined, control signals may be provided to the machine 10 to cause these actions to be taken, upon user input selection of a control element such as the run element or the resume element. Further, such determination and provision may be ceased upon user input selection of a control element such as the stop element or the reset element.

A user may provide input, such as via the input device(s) 42, with regard to the various components of the user interface 50. For example, a user may select one or more script elements 58 for one or more of the parameter blocks 54, and may enter one or more properties for each script element 58 as discussed herein. These user input selections and user input entries may be received by, for example, a control system 100. The control system 100 may further determine, in response to the user input selections and user input entries, one or more actions to be performed by the machine 10 to shape an optical fiber 12. The control system 100 may further provide one or more control signals to the machine 10 to cause the machine 10 to perform the one or more actions.

In exemplary embodiments, the one or more control signals may include script element(s) 58 for one or more parameter blocks 54, properties of the script element(s) 58, and time period(s) of the timeline that are associated with the script element(s) 58.

As discussed, the one or more actions of the machine may include actions of one or more components of the machine 10, such as left Z-axis motor 24 operation, right Z-axis motor 26 operation, sweep Z-axis motor 28 operation, left rotational motor 30 operation, right rotational motor 32 operation, Y-axis motor 34 operation, and/or X-axis motor 36 operation. Such operation may occur in accordance with the entered properties for each script element 58 far an associated parameter block 54 and at a specified time period within timeline 52 during running of a program developed or being developed as discussed herein. Accordingly, each action may, for example, be performed according to a time-based location of the associated script element(s) along the timeline 52 within an associated optical fiber manipulation parameter block 54.

Figure 9:
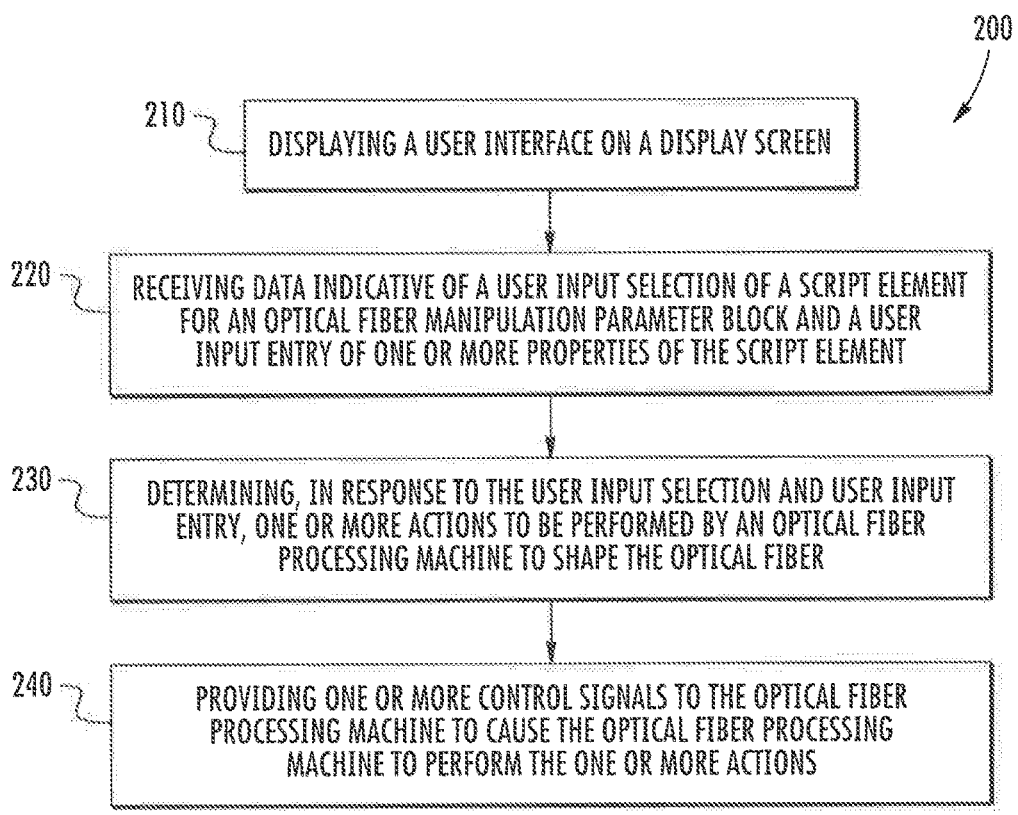
FIG. 9 is a flow diagram illustrating a computer-implemented method of shaping an optical fiber in accordance with embodiments of the present disclosure.

FIG. 9 depicts a flow diagram of an example method according to example embodiments of the present disclosure. FIG. 9 can be implemented by one or more computing devices, such as the control system 100. In addition, FIG. 9 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

For example, a method 200 in accordance with the present disclosure may include, at 210, displaying a user interface 50 on a display screen, as discussed herein. The user interface 50 may include a timeline 52, a plurality of optical fiber manipulation parameter blocks 54 within the timeline 52, and a script block 55 comprising a plurality of script elements 58, as discussed herein. The user interface 50 may further include a control block 60 comprising a plurality of control elements 62 as discussed herein.

Method 200 may further include, at 220, receiving data indicative of user input selections of one or more script elements 58 for one or more optical fiber manipulation parameter blocks 54 and user input entries of one or more properties of the script element(s) 58, as discussed herein.

Method 200 may fortifier include, at 230, determining, in response to the user input selection(s) and user input entry (s), one or more actions to be performed by an optical fiber processing machine 10 to shape an optical fiber 12, as discussed herein.

Method 200 may further include, at 240, providing one or more control signals to the optical fiber processing machine 10 to cause the optical fiber processing machine 10 to perform the one or more actions, as discussed herein.

FIG. 10 depicts an example system 400 according to example embodiments of the present disclosure. As shown, the system 400 can include a control system 410 and one or more display devices 420. The control system 410 can correspond to the control system 100 as described in example embodiments of the present disclosure. The one or more display devices 420 can correspond to the one or more display devices 40 as described in example embodiments of the present disclosure.

The control system 410 can include one or more processors 412 and one or more memory devices 414. The control system 410 can also include a network interface used to communicate with the display device 420 and/or the machine 10 over a network 440. The network interface can include any suitable components for interfacing with one more networks, including for example, transmitters, receivers, ports, controllers, antennas, or other suitable components. The network 440 can include a data bus or a combination of wired and/or wireless communication links. The network 440 can be any type of communications network, such as a local area network (e.g. intranet), wide area network (e.g. Internet), cellular network, or some combination thereof.

The one or more processors 412 can include any suitable processing device, such as a microprocessor, microcontroller, integrated circuit, logic device, or other suitable processing device. The one or more memory devices 414 can include one or more computer-readable media, including, but not limited to, non-transitory computer-readable media, RAM, ROM, hard drives, flash drives, or other memory devices. The one or more memory devices 414 can store information accessible by the one or more processors 412, including computer-readable instructions 416 that can be executed by the one or more processors 412. The instructions 416 can be any set of instructions that when executed by the one or more processors 412, cause the one or more processors 412 to perform operations.

As shown in FIG. 10, the one or more memory devices 414 can also store data 418 that can be retrieved, manipulated, created, or stored by the one or more processors 412. The data 418 can include, for instance, data associated with timeline 52, parameter blocks 54, script block 56, script elements 58 and properties thereof, command block 60, and command elements 62. The data 418 can be stored in one or more databases. The one or more databases can be connected to the control system 410 by a high bandwidth LAN or WAN, or cart also be connected to the control system 410 through network 440. The one or more databases can be split up so that they are located in multiple locales.

The display device 420 can include one or more processors 422 and one or more memory devices 424. The display device 420 can also include a network interface used to communicate with the control system 410 and/or the machine 10 over a network 440. The network interface can include any suitable components for interfacing with one more networks, including for example, transmitters, receivers, ports, controllers, antennas, or other suitable components.

The one or more processors 422 can include any suitable processing device, such as a microprocessor, microcontroller, integrated circuit, logic device, or other suitable processing device. The one or more memory devices 424 can include one or more computer-readable media, including, but not limited to, non-transitory computer-readable media, RAM, ROM, hard drives, flash drives, or other memory devices. The one or more memory devices 424 can store information accessible by the one or more processors 422, including computer-readable instructions 426 that can be executed by the one or more processors 422. The instructions 426 can be any set of instructions that when executed by the one or more processors 422, cause the one or more processors 422 to perform operations. The instructions 426 can be executed by the one or more processors 422 to display, for instance, a user interface on an input/output device 427. The instructions 426 and/or other programs executed by the one or more processors 422 can allow a user to perform functions on a screen surface such as providing user interactions (e.g., touch, cursor) with virtual elements and inputting commands and other data through the screen surface.

The one or more memory devices 424 can also store data 428 that can be retrieved, manipulated, created, or stored by the one or more processors 422. The data 148 can include, for instance, data associated with timeline 52, parameter blocks 54, script block 56, script elements 58 and properties thereof, command block 60, and command elements 62. The data 428 can be stored in one or more databases. The one or more databases can be connected to the display device 420 by a high bandwidth LAN or WAN, or can also be connected to the display device 420 through the network 440. The one or more databases can be split up so that they are located in multiple locales.

The display device 420 can include an input/output device 427. The input/output device 427 can include a touch screen surface. Such touch screen surface can include any suitable form including that of a liquid crystal display (LCD) and can use various physical or electrical attributes to sense inputs and interactions from a user. The input/output device 427 can also include a trackball, mouse, other cursor device, touch pad, data entry keys, a microphone suitable for voice recognition, and/or other suitable input devices. The input/output 427 can also include other suitable output devices, such as other audio or visual outputs suitable for indicating the elements of a user interface (e.g., tasks associated with checklist items).

The technology discussed herein makes reference to computer-based systems, as well as, actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be, shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if the include structural elements that do not differ from the literal language of the claims, or if they include equivalent structural elements with insubstantial differences from the literal languages of the claims.

What is claimed is:

1. A computer-implemented method of shaping an optical fiber, the method comprising:
    displaying, by one or more computing devices, a user interface on a display screen, the user interface comprising a timeline, a plurality of optical fiber manipulation parameter blocks, each optical fiber manipulation parameter block of the plurality of optical fiber manipulation parameter blocks encompassing a plurality of discrete time-based locations within the timeline, and a script block comprising a plurality of script elements;
    receiving, by the one or more computing devices, data indicative of a user input selection of a script element for a selected optical fiber manipulation parameter block of the plurality of optical fiber manipulation parameter blocks, including a user-selected location of the script element at one of the plurality of discrete time-based locations within the timeline encompassed by the selected optical fiber manipulation parameter block, and a user input entry of one or more properties of the script element;
    determining, by the one or more computing devices and in response to the user input selection and user input entry, one or more actions to be performed by an optical fiber processing machine to shape the optical fiber; and
    providing, by the one or more computing devices, one or more control signals to the optical fiber processing machine to cause the optical fiber processing machine to perform the one or more actions at a time corresponding to the discrete time-based location of the script element within the selected optical fiber manipulation parameter block.

2. The method of claim 1, wherein the plurality of optical fiber manipulation parameter blocks comprise a left Z-axis motor block, a right Z-axis motor block, a Z-axis sweep motor block, a left rotation motor block, a right rotation motor block, and a heating element block.

3. The method of claim 1, wherein one of the plurality of script elements is a command block and the one or more properties of the command block comprise one or more of a delay time, a duration, an initial intensity, a final intensity, a direction, or a distance.

4. The method of claim 1, wherein one of the plurality of script elements is a conditional block.

5. The method of claim 1, wherein one of the plurality of script elements is a mode call element.

6. The method of claim 1, wherein one of the plurality of script elements is a motor movement block.

7. The method of claim 1, wherein one of the plurality of script elements is a recipe call element.

8. The method of claim 1, wherein the one or more control signals include a script element for an optical fiber manipulation parameter block, one or more properties of the script element, and a time period associated with the script element.

9. The method of claim 1, wherein the user interface further comprising a control block comprising a plurality of control elements, and wherein the providing step occurs upon receipt of data indicative of a user input selection of a control element.

10. The method of claim 1, wherein the one or more actions of the optical fiber processing machine comprise a left Z-axis motor operation, a right Z-axis motor operation, a Z-axis sweep motor operation, a left rotation motor operation, a right rotation motor operation, or a heating element activation.

11. A system for shaping an optical fiber, the system comprising:
    a display device configured to display a user interface, the user interface comprising a timeline, a plurality of optical fiber manipulation parameter blocks, each optical fiber manipulation parameter block of the plurality of optical fiber manipulation parameter blocks encompassing a plurality of discrete time-based locations within the timeline, and a script block comprising a plurality of script elements; and
    a control system configured to:
        receive data indicative of a user input selection of a script element for a selected optical fiber manipulation parameter block of the plurality of optical fiber manipulation parameter blocks, including a user-selected location of the script element at one of the plurality of discrete time-based locations within the timeline encompassed by the selected optical fiber manipulation parameter block, and a user input entry of one or more properties of the script element;
        determine, in response to the user input selection and user input entry, one or more actions to be performed by an optical fiber processing machine to shape the optical fiber; and
        provide one or more control signals to the optical fiber processing machine to cause the optical fiber processing machine to perform the one or more actions at a time corresponding to the discrete time-based location of the script element within the selected optical fiber manipulation parameter block.

12. The system of claim 11, wherein the plurality of optical fiber manipulation parameter blocks comprise a left Z-axis motor block, a right Z-axis motor block, a Z-axis sweep motor block, a left rotation motor block, a right rotation motor block, and a heating element block.

13. The system of claim 11, wherein one of the plurality of script elements is a command block and the one or more properties of the command block comprise one or more of a delay time, a duration, an initial intensity, a final intensity, or a direction.

14. The system of claim 11, wherein one of the plurality of script elements is a conditional block.

15. The system of claim 11, wherein one of the plurality of script elements is a mode call element.

16. The system of claim 11, wherein one of the plurality of script elements is a motor movement block.

17. The system of claim 11, wherein one of the plurality of script elements is a recipe call element.

18. The system of claim 11, wherein the one or more control signals include a script element for an optical fiber manipulation parameter block, one or more properties of the script element, and a time period associated with the script element.

19. The system of claim 11, wherein the user interface further comprising a control block comprising a plurality of control elements, and wherein the providing step occurs upon receipt of data indicative of a user input selection of a control element.

20. The system of claim 11, wherein the one or more actions of the optical fiber processing machine comprise a left Z-axis motor operation, a right Z-axis motor operation, a Z-axis sweep motor operation, a left rotation motor operation, a right rotation motor operation, or a heating element activation.

* * * * *